Patented Feb. 6, 1945

2,368,940

UNITED STATES PATENT OFFICE 2,368,940

PROCESS FOR PRINTING NYLON

Charles Franklin Miller, Wilmington, Del., assignor to E. I. du Pont de Nemours & Company, Wilmington, Del., a corporation of Delaware No Drawing. Application February 10, 1943, Serial No. 475,433

1 Claim. (Cl. 8—70)

This invention relates to an improved process for the printing of nylon with vat dyes.

When nylon is printed by the conventional printing methods with vat dyes, using the normal amount of alkalies and reducing agent in the printing paste, it has been found that the designs are not clean-cut in outline, and on discharge printing there occurs a "halo" about the design on illumination prints that is objectionable. While this lack of sharpness and the halo can be corrected by subsequent treatment of the goods with mild oxidizing agents such as hydrogen peroxide or sodium meta-nitrobenzene sulfonate, or with mild non-volatile organic acids, such treatment involves an extra step and therefore adds to the expense and time involved in the printing operations.

It is an object of this invention to provide a process for printing nylon with vat dyes which will give directly patterns of sharp outline and which will not exhibit the "halo" on illumination prints.

It has been known that one of the characteristics of nylon is its special affinity for most vat dye colors, making it possible to dye this fiber with vat colors by employing mild agents and mild alkalies. In the printing of cotton or other fabrics with vat dyes the alkali metal carbonates are usually employed in place of the caustic alkalies, but in order to give satisfactory reduction during the ageing of the print it was necessary to employ sufficient alkali to permit complete solution of the vatted dye in the fiber if uniform and strong prints were to be obtained.

I have found that the lack of sharpness in the ordinary direct prints and the "halo" which occurs in printing by discharge methods on nylon can be overcome by printing the vat colors on nylon with printing pastes containing, in addition to the usual thickeners and color, an alkali metal sulfoxylate-formaldehyde and very small amounts of an alkali metal carbonate. Where in the usual printing methods from 5% to 15% of alkali metal carbonate is employed, based on the entire weight of the printing paste, I have found that to overcome the lack of sharpness and the "halo" in the printing of nylon the alkali metal carbonate should be employed only in amounts of from 0.1% to 0.5%, based on the total weight of the printing paste.

It is of course recognized that all vat dyes are not printing colors, and therefore this invention is directed only to those vat dyes that are considered to be printing colors for cotton and other forms of cellulose. No claim is made that the reduction in the amount of alkali will permit colors that ordinarily do not print cotton to be used on nylon, although in many instances, particularly in the anthraquinone series, compounds which are not recognized as vat dyes for cotton have been found to color nylon in desirable shades, for it is known that nylon exhibits a peculiar affinity for dyes that is not exhibited by any other single fiber.

It is of course to be understood that, due to the varying properties of the vat colors, the amount of alkali that should be employed within the limits above specified will vary. In general, the indo-phenols and the sulfurized indo-phenol vat dyes require the least amount of alkali metal carbonate, while the higher amounts may be employed with dyes of the anthraquinone vat dye series without detrimental results. The indigos and thioindigos in general require intermediate amounts of alkali within the limits above stated.

This invention is applicable to the printing of nylon with vat dyes of all classes, such as the indigo and thioindigo colors, the anthraquinone vat colors, and indo-phenols and sulfur dyes.

In addition to giving prints having good sharpness of outline, or prints that are free from "halo," the use of the smaller amounts of alkali metal carbonates permits the preparation of printing pastes of improved stability because there is less chance for premature reduction of the color before or while it is being applied to the goods. Because of the increased stability, the printing pastes can be prepared in much larger batches than usual, thus offering an economy in operating practice as well as an economy in the use of the material itself. The potassium sulfoxylate formaldehyde may be employed in place of the sodium compound in the following examples, since the invention contemplates the use of any of the alkali metal sulfoxylate formaldehydes employed generally in the printing of vat dyes. In the examples below, the sodium sulfoxylate formaldehyde used is considered to be only sodium sulfoxylate formaldehyde, but in practice the commercial grades will be found to contain from 0.5% to 3.0% alkali as sodium carbonate, so that in many cases no alkaline agent other than that present as an impurity in the reducing agent need be added to the printing paste. The thickening agents employed are those normally used in the printing of vat dyestuffs on cotton and other cellulose material.

The following examples are given to illustrate the invention. The parts used are by weight.

Example 1

| | Parts |
|---|---|
| 20% paste of Indigo | 15.0 |
| Sodium sulfoxylate formaldehyde | 10.0 |
| Sodium carbonate | 0.3 |
| Thickening | 74.7 |
| | 100.0 |

The above described printing paste when printed on nylon, aged 10 minutes in a vat color ager to reduce the color, oxidized and finished in the usual manner for vat colors of this series gives a print of deep blue shade which is characterized by a sharpness of mark superior to that obtained with printing compositions containing the normal amounts of potassium carbonate (5% to 15%) and is equal thereto in strength and brilliance.

Example 2

| | Parts |
|---|---|
| 18% paste of Sulfanthrene Blue GR | 20.0 |
| Sodium sulfoxylate formaldehyde | 5.0 |
| Glycerin | 2.5 |
| Sodium carbonate | 0.1 |
| Thickening | 72.4 |
| | 100.0 |

The above described printing paste when printed on nylon, aged 5 minutes in a vat color ager to reduce the color, oxidized and finished in the usual manner for vat colors of this type, gives a navy blue design of the same superior sharpness of outline as described in Example 1.

Example 3

| | Parts |
|---|---|
| 15% paste of Sulfanthrene Orange R | 20.0 |
| Sodium sulfoxylate formaldehyde | 15.0 |
| Sodium carbonate | 0.5 |
| Diethylene glycol | 2.0 |
| Thickening | 62.5 |
| | 100.0 |

Nylon dyed blue with 2,4-dinitro-6-chlor benzene azo 2-dihydroxy ethylamino 4-acetyl amino anisol, when printed with the above described printing paste, aged 10 minutes in a vat color ager to reduce the vat color and to discharge the ground shade, oxidized and finished in the usual manner for vat colors, gives a bright orange design, free of the "halo" produced when the usual amount of (5% to 15%) potassium carbonate is used in the above formulation.

As further illustrative of commercial printing colors of the vat dye classes, mentioned above, that may be substituted for the colors used in the above examples, that have been found to give improved prints when applied according to this invention, are:

| Trade name | Colour index No. |
|---|---|
| Du Pont Indigo 20% Paste | 1177. |
| Sulfanthrene Orange R | 1217. |
| Sulfanthrene Blue 2BD Paste | 1184. |
| Sulfanthrene Brilliant Blue 4G Double Paste | 1189. |
| Sulfanthrene Red 3B Paste | 1212. |
| Ciba Violet R Paste | 1222. |
| Sulfanthrene Pink FB Paste | 1211. |
| Sulfanthrene Brown G Paste | Prototype #121. |
| Iso-thio-indigo | Iso-thio-indigo. |
| Sulfanthrene Pink FF Paste | Prototype #109. |
| Ciba Pink BG Paste | A dichloro-dimethyl-thioindigo. |
| Ciba Red R | 1229. |
| Ponsol Yellow AR Double Paste | 1132. |
| Indanthrene Golden Yellow GKA Double Paste | Halogenated dibenz-pyrenequinone. |
| Ponsol Jade Green | 1101. |
| Ponsol Golden Orange G Double Paste | 1096. |
| Ponsol Pink B Double Paste | Prototype #123. |
| Ponsol Red BN Paste | 1162. |
| Algol Yellow GW | 1-benzoyl amino anthraquinone. |
| Algol Red 5G | 1,4-dibenzoyl amino anthraquinone. |
| Sulfogene Brilliant Blue BGL | 961. |
| Sulfogene Fast Green YCF | 1006. |
| Sulfanthrene Blue GR | 969. |
| Ponsol Brilliant Violet 4RN Paste | Prototype #117. |
| Ponsol Golden Orange RRT Paste | 1097. |

It is of course understood that any appropriate dischargeable ground color may be employed, and that with the exception of the reduction in amount of alkali metal carbonate employed, the usual printing, ageing, oxidizing and finishing methods are employed.

I claim:

In the process of printing nylon dyed with a dischargeable ground color, with a vat dye in which the vat dye is applied with the usual printing paste containing an alkali metal sulfoxylate formaldehyde reducing agent, the step which comprises employing as the only added alkali in the printing paste an alkali metal carbonate equal to from 0.1% to 0.5% of the weight of the printing paste.

CHARLES FRANKLIN MILLER.